UNITED STATES PATENT OFFICE.

ERICH EBLER, OF HEIDELBERG, GERMANY.

PROCESS FOR THE PREPARATION, ISOLATION, AND ENRICHMENT OF RADIUM AND OTHER RADIO-ACTIVE SUBSTANCES.

1,059,531.   Specification of Letters Patent.   Patented Apr. 22, 1913.

No Drawing.   Application filed March 4, 1912. Serial No. 681,498.

*To all whom it may concern:*

Be it known that I, ERICH EBLER, a citizen of the German Empire, residing at Heidelberg, Baden, Germany, have invented certain new and useful Improvements in Processes for the Preparation, Isolation, and Enrichment of Radium and other Radio-Active Substances, of which the following is a specification.

The object of this invention is to isolate or separate by absorption radio-active substances, more particularly radium, radio-lead, polonium, ionium and others, from solutions of products containing them, such as for instance opened-up sources of minerals, sediments of springs, spring water, radio-active residues of manufacture etc., without employing tedious chemical separation and fractional operations, or to enrich such substances as regards the non-active accompanying substances.

It has been known for a long time that certain solid substances, by their presence in solutions, reduce the concentration of the latter by taking up and holding fast (adsorbing) portions of the dissolved substance in a greater or smaller quantity, according to the nature of the solid and of the dissolved substance. Such action has been known for a long time in the case of various forms of amorphous carbon (charcoal, bone black, blood carbon, lamp-black, etc.) (Lowitz 1791; Payen 1822; Graham 1830.)

The examination of the radio-activity of mineral springs has shown that certain colloidal substances (jellies) have an extraordinary adsorbing capacity as regards radio-active substances. In springs which contain radio-active substances, for instance salts of radium, and at the same time deposit sediments containing silicic acid, aluminium-hydroxid, ferric-hydroxid and the like in colloidal state, the said sediments have been found to collect the greater portion of the radio-active substances contained in the springs (for instance see the account of the "Max Spring in Bad Dürkheim on the Haardt," E. Ebler, *Transactions of the Natural-Historico Medical Society at Heidelberg*, N. F. volume 9, page 87 and the following). During further examination of these conditions, it was found that it was the adsorption of the radio-elements on the colloids that was the cause of this phenomenon, and that the said behavior can be utilized in order to enrich radio-active substances by a simpler method than has been employed hitherto, namely by adsorption. More particularly, for these practical purposes, colloids were examined which, after they fulfilled their object of adsorption, could be removed again without residue and without carrying away the radio-active substance. Thus it was ascertained that radium salts, salts of radio-lead, salts of polonium, X-salts of uranium, were for the most part adsorbed, when their solutions have been treated for some time with inorganic colloids such as for instance colloidal silicic acid, colloidal trisulfid of arsenic, colloidal superoxid of manganese, or with organic colloids such as for instance acetyl-cellulose. If after the treatment the colloids are again removed from the solutions, which, according to the kind of their distribution, can be effected by simple removal (threads of acetyl-cellulose) or by centrifuging (trisulfid of arsenic, silicic acid), filtering or expressing, the solutions will be found poorer in radio-active substance, for the latter will be chiefly on the colloid. If adsorbing colloids are chosen which, owing to their chemical nature, can be volatilized in any manner without a residue (for instance, silicic acid as fluorid, arsenic as trichlorid, nickel and iron as carbonyl compounds, aluminium as chlorid), the radio-active substance in question will be obtained in a highly concentrated state as residue of the volatilization of the colloid. Organic colloids, such as for instance acetyl-cellulose or gelatin, can be removed in a very simple manner by reducing them to ashes.

The process is more particularly useful because it can be applied directly to very diluted solutions which have been subjected to a very slight preliminary treatment, such as are obtained from radio-active minerals, residues, sediment of springs etc. after the opening up, or directly to spring waters containing radium, and because it does away with the tedious and complicated chemical enrichment and separations requiring a great deal of time and material, which in view of the slight absolute quantities by weight of the radio-active substances compared to the large quantities of various inactive matter, rarely lead to a good result.

It has been found that colloidal gels which, according to the above described process enrich radio-active substances from their diluted solutions by adsorption, also withdraw gaseous radio-active substances (radio-active emanations) from mixtures of air and other gases with the latter substances, so that solid enriched emanation-preparations are produced, adsorbed in dry colloids. As these emanations, owing to their gaseous nature, completely penetrate through the loose colloidal structures, the "thorough contact" of the substance to be enriched, with the adsorbing colloid, required in the prior process when dealing with solutions can be obtained in a very simple manner when dealing with radio-active emanations. It is merely necessary to bring the radio-active substance giving off the emanation into a vessel closed in an air-tight manner, together with the adsorbent substances spread out in the thinnest possible layer. The colloidal adsorbent then adsorbs the emanation given off in the air chamber of the vessel, by the substance giving off the emanation, and the said emanation is enriched in the adsorbent until equilibrium is reached, which depends on the emanation given off and decomposing in a unit of time. As the quantity of emanation decomposing in the unit of time is a given constant number for each radio-active emanation, the proportion of emanation in the emanation-preparations obtained in the last instance depends, in case of a given adsorbent, exclusively on the quantity of the emanation quantity originally given off, that is to say, on the proportion of the "emanating" substance in the emanating preparation (that is to say, for instance, in the case of adsorption preparations of radium emanation in a given adsorbent, on the proportion of radium in the radium preparation giving off emanations). This behavior results in a considerable advantage of the preparations obtained, more particularly for their use for medical purposes, the said advantage consisting in the simplicity of assaying the adsoprtion-emanation-preparations. For when the proportion of emanation has been once determined in given conditions, after the equilibrium of the emanation-preparations obtained has been reached, there will be obtained, by keeping the same conditions of working (that is to say, by using the same preparations giving off emanations, which for that reason are preferably secured once for always in the closed vessel, by using always the same adsorbent, all in the same quantity, nature and manner of charging as in the gaging experiment, and by using the same vessel), emanation preparations always containing the same proportion, so that the assaying of the emanation can be effected by simple weighing of the adsorption preparations freshly taken from the vessel. The adsorption preparations must be used immediately after withdrawing them from the action of the preparations giving off emanations, for even in the adsorbed state, each radio-active emanation decomposes in accordance with the law of time characteristic for the same (thus for instance radium emanation (niton) to the extent of 50% in each 3.85 days). The preparation permanently giving off emanations can however always saturate with emanation fresh quantities of the adsorbing preparation. That fact, namely that the expensive preparations giving off emanations are not in any way consumated, and merely the adsorbent has to be always replaced, is a considerable advantage of the new process. They can be used always, when once obtained, for manufacturing new emanation preparations.

The shape and the material of the vessels in which the emanating and the adsorption preparations are brought together, does not affect the result. The experiment can be easily arranged therefore so that every thing can be sterilized, which is of special importance when the process is to be used for medical purposes.

Of the examined colloids, the dry colloid of pure silicic acid, in the shape of powder, deprived of water to the greatest possible extent, has been found specially suitable for manufacturing concentrated adsorption preparations of radium emanation. This is of special importance for medical purposes, as silicic acid, being chemically a completely neutral body, can be used not only externally, but also internally, by injecting the emanation preparations in suspension into ulcers and also by drinking such suspensions.

*Examples.*

1. From a radio-active sediment of the spring of St. Joachimsthal, a chlorid of lead containing chlorid of radio-lead was first of all obtained, by boiling with a mixture of hydrochloric and nitric acids known as aqua regia and by leaving the extracts to cool and by repeated crystallization. 0.153 gr. of the said substance, which in arbitrary units showed an activity of 473.9 (=3097 per 1 gr.), dissolved in 23.3 gr. of water, were strongly shaken with 0.9896 gr. of silicon hydroxid-colloid for two hours at 85°. The liquid was then separated from the colloid by centrifuging; after the evaporation of the clear liquid, there were still left 0.1355 gr. of substance which, in the same arbitrary units, showed an activity of 81.1 (=598.5 per 1 gr.). The silicic acid residues removed by centrifuging, were thoroughly evaporated, after drying, with fuming hydrofluoric acid, with the addition of a few drops of hydrochloric acid. There was finally left a residue weighing 0.014 gr. and showing the activity of 562.4 (=40172 per 1 gr.).

2. In a similar experiment, the quantity of silicic acid colloid was varied, 0.1428 gr. of chlorid of lead of radio-lead, of the activity of 475.3 (=3328 per 1 gr.), dissolved in 23.5 gr. of water, with addition of 4.162 gr. of silicic acid colloid, being shaken for two hours also at 85°. After the separation of the liquid and the colloid, the evaporation of water or of the silicon as fluorid, the residue obtained from the water solution weighed 0.1081 gr. and had an activity of 80.4 (=743.8 per 1 gr.), while the residues obtained from the silicic acid, weighed 0.0537 gr. and showed an activity of 764.7 (=14241 per 1 gr.).

3. 0.0264 gr. of radium-barium chlorid which, according to the $\gamma$-ray methods of Eve (*Le Radium* 3.1906.225) contained $3.24 \times 10^{-2}$ mg. radium, were dissolved in 24.5 gr. of water and strongly shaken with 1.1256 gr. of silicic acid colloid for 4½ hours at 86°. The silicic acid was then again separated from the solution by centrifuging, then the silicic acid volatilized as a fluorid, and the residues obtained were weighed and measured. There was left behind a residue weighing only 0.0004 gr., the contents of radium in which, determined by the $\gamma$-radiation, amounted to $3.30 \times 10^{-2}$ mg. The whole of the radium was therefore adsorbed by the silicic acid. In accordance with this result, the residue of the solutions evaporated and separated from the silicic acid, weighed 0.0225 gr. and showed a scarcely perceptible $\gamma$-radiation.

4. 0.0312 gr. of radium-barium chlorid which, according to their $\gamma$-radiation, contained $3.77 \times 10^{-2}$ mg. radium, were dissolved in 21.731 gr. of water and shaken with 4.1432 gr. of silicic acid colloid for 4½ hours at 86°. After the centrifuging and expulsion of the silicon, there was left behind a residue weighing 0.0084 gr., the $\gamma$-radiation of which gave $3.23 \times 10^{-2}$ mg. of radium. 86% of the original quantity of radium were therefore adsorbed by the silicic acid.

5. Slight adsorption of radio-active emanations by solid bodies is shown by the law of time, according to which the substances rendered active lose the so-called "induced activity," being slower than required by the active precipitates produced from niton (P. Curie and J. Danne, *Comptes Rendus de l'Academie des Sciences*, of the 5th February 1903). Dry colloidal silicic-acid gel absorbs the emanations however, more particularly radium emanation, so strongly that silicic acid charged with radium emanation loses its activity not in accordance with the law of time required by the active efflorescences produced by the radium emanation, but in accordance with the law of decomposition of the radium emanation itself. Into an air-tightly closed vessel of about two-thirds of a liter capacity, were separately introduced simultaneously 0.2 gr. of radium-barium bromid containing 1.5% metallic radium, and 125 gr. of colloidal silicic-acid gelatin in the shape of powder, of the approximate composition of $4SiO_2 3H_2O$. After 48 hours the silicic-acid colloid was withdrawn from the influence of the radium preparation giving off emanations, and in order to determine the activity $I_t$ the fall of activity was determined at various moments $t$. The calculated values of $I_t$ were determined by the formula $$I_t = I_o e^{-\lambda t}, \text{ where } \lambda = 2.085 . 10^{-6}, \text{ sec.}^{-1},$$

$\lambda$ being the radio-active constant, which has a definite and characteristic value for each type of radio-active matter. From this equation it follows that $$\lambda = \frac{1}{t} . \log . \frac{I_o}{I_t}$$

and that the half-period constant $$H.C. = \frac{1}{\lambda} \log . 2,$$

"$I_t$" being the intensity of the radiation at any given time $t$, and "$I_o$" the initial intensity. If "$I_t$" be assumed to be ½ "$I_o$" in the above equation, the special value of $t$ is the half-period constant.

| $t$ in days. | $I_t$ in volt/hours observed. | $I_t$ in volt/hours calculated. | $\lambda$ in sec.$^{-1}$ calculated from $I_t$. | H.C. in days calculated from $\lambda$. |
|---|---|---|---|---|
| 0 | 57580 | 57580 | | |
| 1.05 | 48550 | 47620 | $1.98.10^{-6}$ | 4.25 |
| 2.10 | 38960 | 39570 | $2.16.10^{-6}$ | 3.72 |
| 3.07 | 33880 | 33200 | $2.00.10^{-6}$ | 4.02 |
| 4.00 | 29770 | 28030 | $1.91.10^{-6}$ | 4.20 |

This result of experiments shows that the radium emanation is really adsorbed by the silicic acid, and not that the silicic acid becomes active merely by induction, for in the latter case it would have lost the activity with a half-value period (H.C) of only 28 minutes.

6. 0.02 gr. of radium-barium bromid containing 1.5% of metallic radium, were introduced into an air-tightly closed vessel of about 150 cubic cms. capacity, together with 1.25 gr. of silicic acid colloid in the shape of powder, of the composition $4SiO_2 3H_2O$. After 30 days, the proportion of emanation in the 1.25 gr. of silicic acid was determined. It amounted to 0.15 millicurie (1 curie=the unit of the emanation quantity=the quantity of emanation in radio-active equilibrium with 1 gr. of metallic radium). After the removal of the first silicic acid charge, fresh silicic acid was at once supplied to the radium preparation. After another 30 days, the new 1.25 gr. of silicic acid had adsorbed again 0.15 millicurie radium emanation.

7. 1.82 mg. of radium bromid containing 1.07 mg. of metallic radium, were placed, together with 2 gr. of silicic acid colloid, of the composition of $1SiO_2 5H_2O$, into a space of 120 cubic centimeters capacity, closed in an air-tight manner. After 30 days, the proportion of emanation in the adsorption preparation obtained, was determined. It amounted to 0.7 millicurie. New silicic acid after another 30 days, also took up 0.7 millicurie of radium emanation. With this process the preparations giving off emanations are preferably maintained at a temperature of 100°.

It was found by similar experiments that other colloids and substances with strongly-developed surface adsorbed by selection radio-active substances in a very strong manner.

What I claim is:—

1. The process which consists in producing adsorption-combinations of a colloid with a radio-active substance by bringing the radio-active substance into intimate contact with the colloid.

2. The process of separating radio-active compounds from fluids containing the same, comprising adsorbing said radio-active compound upon a gel in contact with said fluid.

3. The process of separating radio-active compounds from fluids containing the same, comprising adsorbing said radio-active compound upon the surface of a colloid in contact with said fluid, and then separating said colloid from said adsorbed radio-active compounds.

4. The process of separating radio-active compounds from fluids containing the same, comprising adding to said fluid a substance capable of adsorbing said radio-active compound, separating said substance and adsorbed radio-active compounds from said fluid, and then separating said substance from said radio-active compound.

5. The process of separating radio-active compounds from fluids containing the same, comprising adsorbing said radio-active compound upon the extended surface of a colloid suspended in said fluid, separating the colloid and radio-active compounds from said fluid, and converting said colloid into volatile compounds.

6. The process of separating radio-active compounds from fluids containing the same, comprising adding to said fluid a colloid capable of adsorbing said radio-active compound, separating said colloid and adsorbed radio-active compounds from said fluid, and then separating said colloid from said radio-active compound.

7. The process of separating radio-active compounds from fluids containing the same, comprising adding to said fluid a colloid capable of adsorbing said radio-active compound, mixing said fluid and colloid so as to bring them into intimate contact with each other, thereby adsorbing the radio-active compounds on the colloid, separating said colloid and adsorbed radio-active compounds from said fluid, and then separating said colloid from said radio-active compound.

8. The process of separating radio-active compounds from fluids containing the same, comprising agitating a colloid in said fluid, thereby adsorbing said radio-active compounds upon said colloid, separating said colloid and adsorbed radio-active compounds from said fluid, and then separating said colloid from said radio-active compound.

9. The process of separating radio-active compounds from fluids containing the same, comprising agitating a colloid in said fluid, thereby adsorbing said radio-active compounds, separating said colloid and adsorbed radio-active compounds from said fluid, repeating the treatment of said fluid with fresh colloid, and separating the colloid with its adsorbed radio-active compounds, and separating the colloid from the adsorbed radio-active compounds.

10. The process of separating radio-active compounds from fluids containing the same, comprising adding colloidal silica to said fluid, thereby adsorbing said radio-active compounds, separating said silica and adsorbed radio-active compounds from said fluid, and decomposing said silica.

11. The process of separating radio-active compounds from fluids containing the same, comprising adding colloidal silica to said fluid, bringing said silica into intimate contact with said fluid, thereby adsorbing said radio-active compounds, separating said silica and adsorbed radio-active compounds from said fluid, and then separating said silica from said radio-active compound.

In testimony whereof I affix my signature in presence of two witnesses.

ERICH EBLER.

Witnesses:
 JOSEPH PEIFFER,
 S. H. SHANK.